(12) United States Patent
Kato

(10) Patent No.: US 8,432,574 B2
(45) Date of Patent: Apr. 30, 2013

(54) INFORMATION PROCESSING APPARATUS, INFORMATION PROCESSING METHOD, AND STORAGE MEDIUM

(75) Inventor: Hisashi Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 12/503,843

(22) Filed: Jul. 16, 2009

(65) Prior Publication Data
US 2010/0014132 A1 Jan. 21, 2010

(30) Foreign Application Priority Data
Jul. 18, 2008 (JP) ................................ 2008-187167

(51) Int. Cl.
*H04N 1/46* (2006.01)
(52) U.S. Cl.
USPC ............................ 358/1.18; 358/1.2; 358/2.1
(58) Field of Classification Search .................. 358/1.1, 358/1.2, 1.9, 2.1, 1.18
See application file for complete search history.

(56) References Cited

U.S. PATENT DOCUMENTS

| | | | | |
|---|---|---|---|---|
| 6,865,355 B2 * | 3/2005 | Burkes et al. | ................... | 399/85 |
| 8,049,922 B2 * | 11/2011 | Murata et al. | ................. | 358/1.2 |
| 8,050,587 B2 * | 11/2011 | Kurihara | .......................... | 399/82 |
| 2002/0054352 A1 * | 5/2002 | Shibasaki | ...................... | 358/2.1 |
| 2003/0184788 A1 * | 10/2003 | Watanabe et al. | ............. | 358/1.13 |
| 2004/0095587 A1 * | 5/2004 | Brown et al. | ................... | 358/1.2 |
| 2008/0291492 A1 * | 11/2008 | Miyagi et al. | ................ | 358/1.15 |
| 2009/0002732 A1 * | 1/2009 | Shirata | ............................ | 358/1.9 |
| 2009/0129805 A1 * | 5/2009 | Kurihara | ......................... | 399/82 |
| 2012/0081720 A1 * | 4/2012 | Pandit | ............................ | 358/1.9 |

FOREIGN PATENT DOCUMENTS

| | | |
|---|---|---|
| CN | 1667643 A | 9/2005 |
| JP | 2000-94777 A | 4/2000 |
| JP | 2000-094777A A | 4/2000 |
| JP | 2006-159845 A | 6/2006 |

* cited by examiner

*Primary Examiner* — Kimberly A Williams
(74) *Attorney, Agent, or Firm* — Canon U.S.A., Inc. IP Division

(57) ABSTRACT

An information processing apparatus for laying out a plurality of drawing data elements contained in a document in one or more pages includes a rearrangement determining portion configured to determine whether at least one of the plurality of drawing data elements can be rearranged in a blank area in a different page and a color output determining portion configured to, when the rearrangement determining portion determines that the drawing data element can be rearranged in the blank area, determine whether rearrangement of the drawing data element in the different page will change a color output result of the drawing data element.

12 Claims, 17 Drawing Sheets

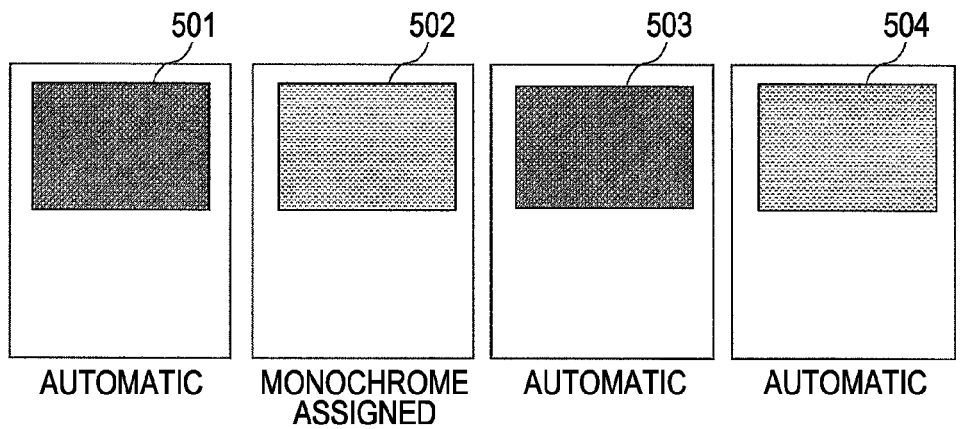
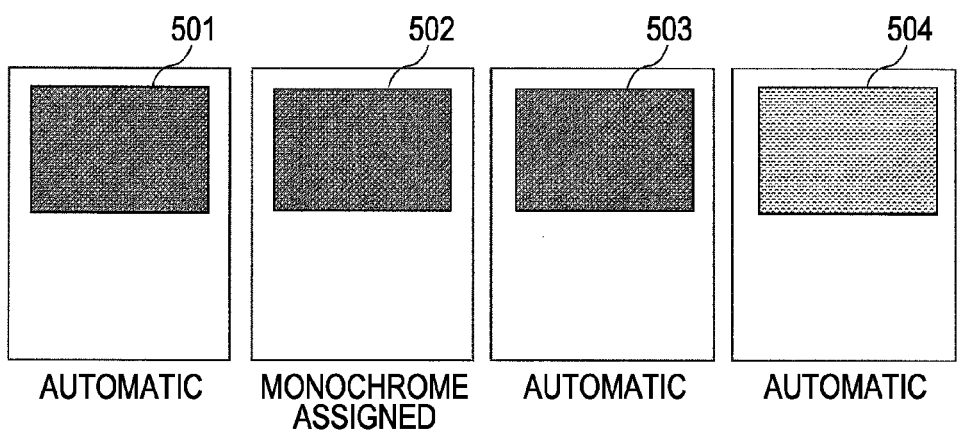
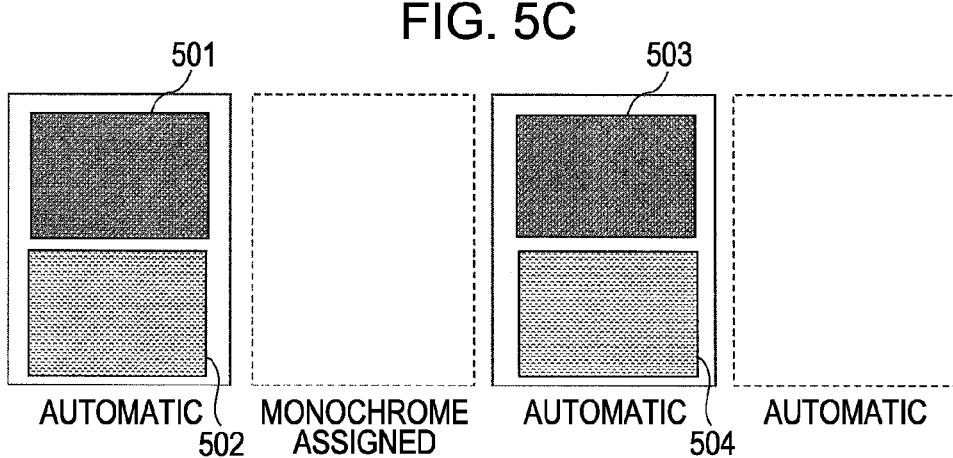

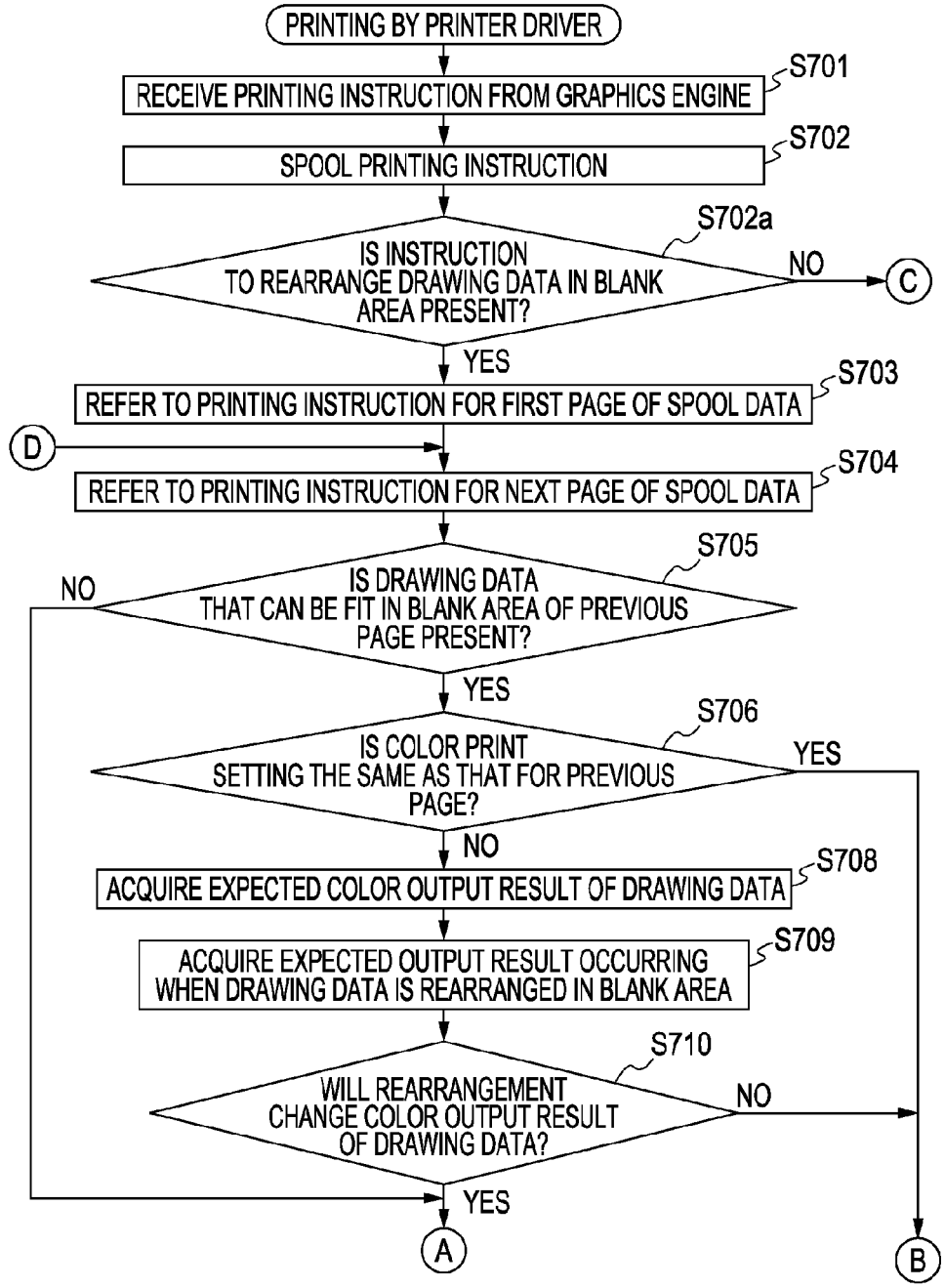

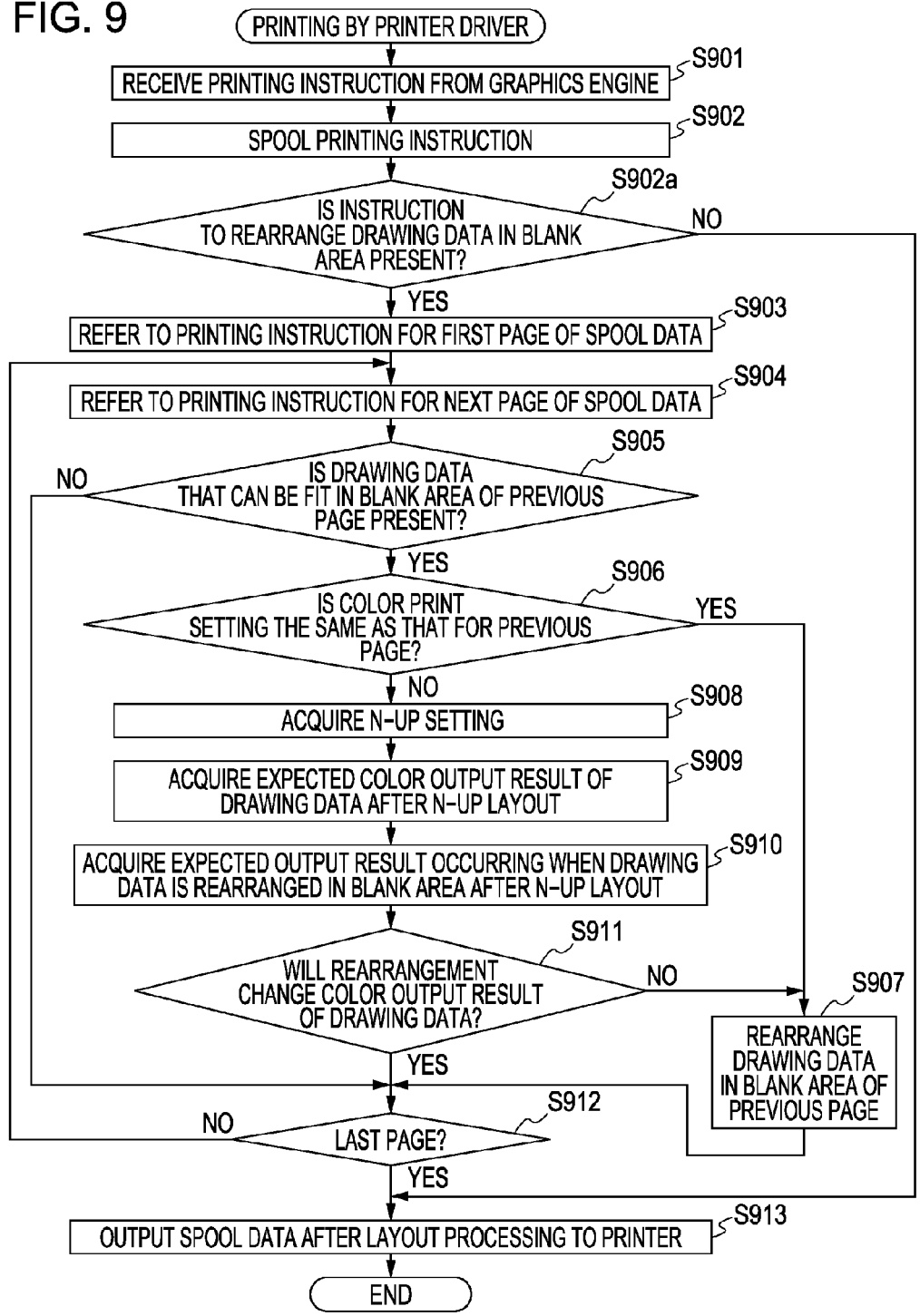

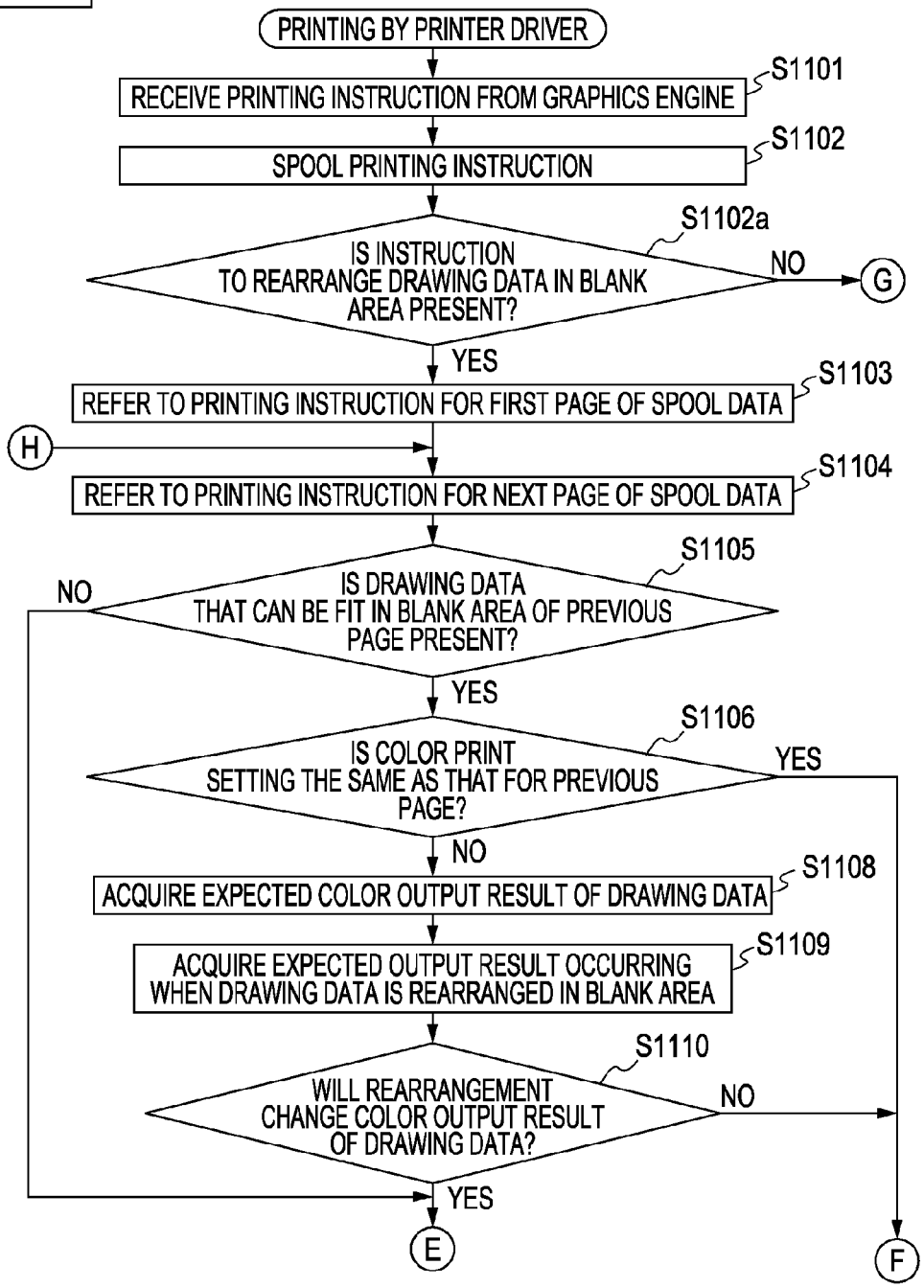

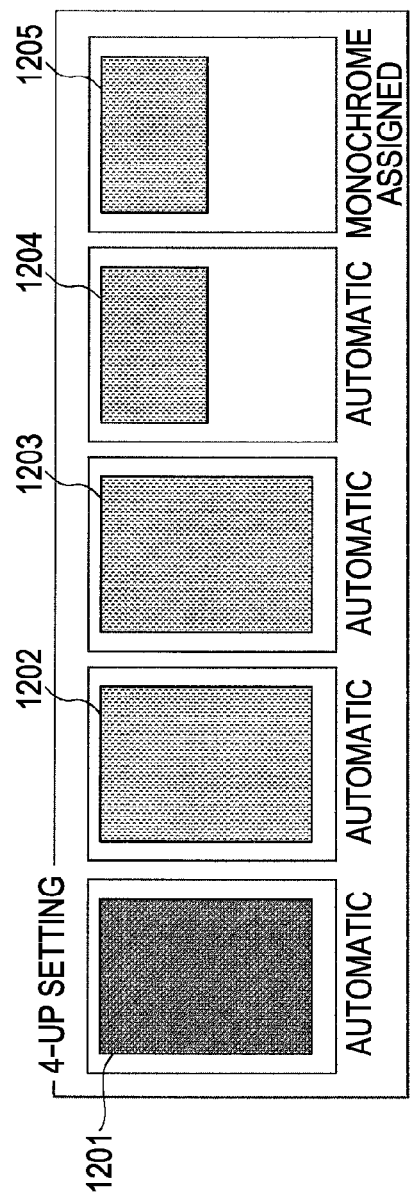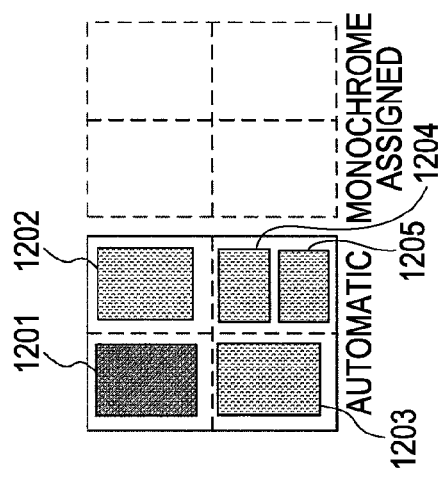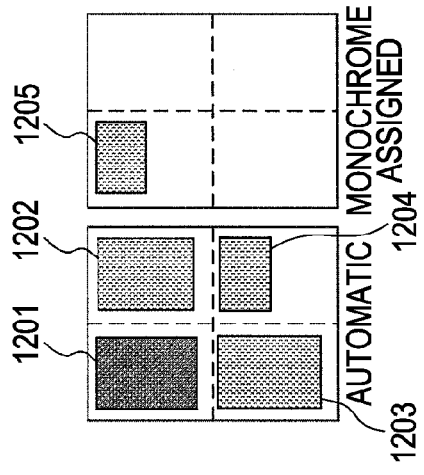

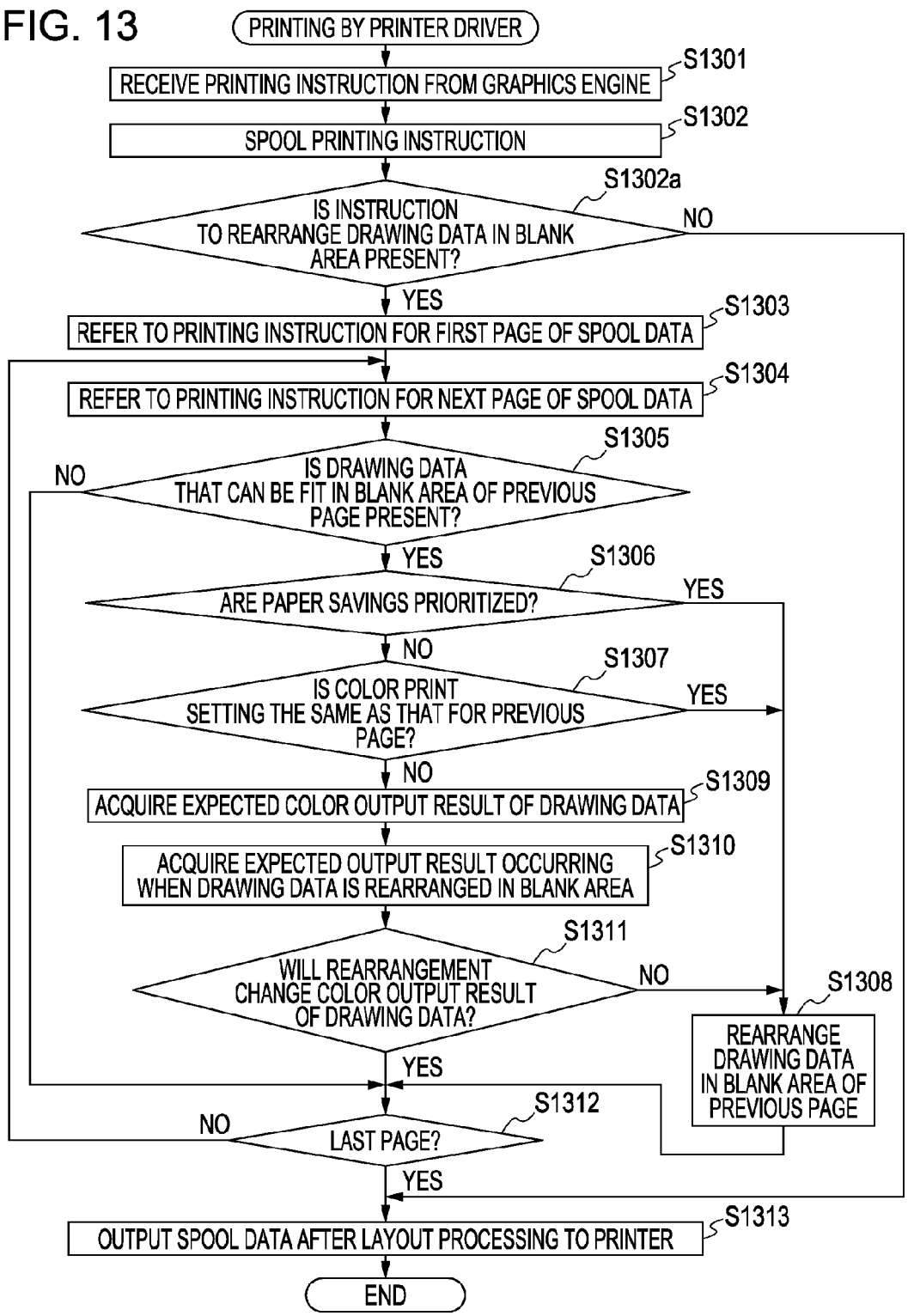

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus and information processing method for laying out a plurality of drawing data elements contained in a document in one or more pages.

2. Description of the Related Art

During the creation of a document of a plurality of pages using an information processing apparatus, a user may instruct the information processing apparatus to print the document to check the content of the printed output in some cases. In such cases, the printed output may have a page that contains a large blank area. Printing such a page leads to wasting sheets.

Japanese Patent Laid-Open No. 2000-94777 describes, in printing a document that has a large blank area, reducing the large blank area. More specifically, an information processing apparatus described in this patent document converts a plurality of image data elements into images and rearranges them in a single sheet to save printing sheets.

In printing color drawing data (image data), the amount of consumption of ink or toner is large.

To reduce the consumption, in printing a page that would require a considerable amount of ink or toner consumption, a user can explicitly assigns monochrome printing, instead of color printing.

One specific example of the above-described technique is described below with reference to FIGS. 15A to 15C. FIGS. 15A to 15C illustrate how ink or toner consumption is reduced by a change in print setting in printing a document that contains both color and monochrome drawing data elements. In the drawings, darkly shaded drawing data elements 1501 and 1503 represent monochrome data, whereas drawing data elements 1502 and 1504 represent color data. The print setting for each drawing data element is indicated below each page in FIGS. 15A to 15C.

In the print setting, "automatic" represents the setting in which print data in a page determined as including the color property is output in color mode and print data in a page determined as having only the monochrome property is output in monochrome mode. "Monochrome assigned" is the setting in which print data is output in monochrome mode even if the print data is color data.

As illustrated in FIG. 15B, for example, when a user changes the print setting for the drawing data element 1502 in the second page from "automatic" to "monochrome assigned," toner or ink for use in color mode can be saved. Similarly, when a user changes the print setting for the drawing data element 1504 in the fourth page from "automatic" to "monochrome assigned," toner or ink for use in color mode can be saved.

In this way, with the above-described known technique, toner or ink can be saved by a change from color drawing data to monochrome drawing data in the print setting, and printing sheets can be saved by a decrease in a blank area in a document.

The possibility of achieving an intended color output while reducing waste of printing by using a combination of the change and the decrease is discussed below.

When the technique described in the above-mentioned Japanese Patent Laid-Open No. 2000-94777 is applied to the document illustrated in FIG. 15A, a resultant output is illustrated in FIG. 15C. More specifically, the information processing apparatus lays out the color data element 1502 at the second page in a blank area in the first page and lays out the color data element 1504 at the fourth page in a blank area in the third page. That is, the information processing apparatus can save printing sheets corresponding to two pages by positioning image data in a blank area.

However, in the example illustrated in FIG. 15C, because the color data elements 1502 and 1504 are laid out in the first and third pages, respectively, in which "automatic" is set as the print setting, the printing mode is changed to color mode. Accordingly, the drawing data elements 1501 to 1504 are output in color mode, so there is a problem in which toner or ink cannot be saved.

SUMMARY OF THE INVENTION

It is desired to provide an information processing apparatus and information processing method capable of producing a color output as desired by a user while reducing waste of printing.

According to an aspect of the present invention, an information processing apparatus for laying out a plurality of drawing data elements contained in a document in one or more pages, the page and the drawing data element in the respective page being assigned a color output setting, is provided. The information processing apparatus includes a rearrangement determining unit and a color output determining unit. The rearrangement determining unit is configured to determine whether at least one of the plurality of drawing data elements can be rearranged in a blank area in a different page. The color output determining unit is configured to, when the rearrangement determining unit determines that the drawing data element can be rearranged in the blank area, determine whether the drawing data element to be rearranged has a different color output setting from the different page. In dependence on the output of the color output determining unit, the rearrangement determining unit determines whether or not the drawing data element is to be rearranged in the different page.

Further features of the present invention will become apparent from the following description of exemplary embodiments (with reference to the attached drawings).

BRIEF DESCRIPTION OF THE DRAWINGS

FIGS. 5A to 5C illustrate an example of how drawing data is rearranged according to the first embodiment of the present invention.

FIGS. 7A and 7B depict a flowchart that illustrates an example of a process for rearranging drawing data according to a second embodiment of the present invention.

FIG. 9 is a flowchart that illustrates one example of a process for rearranging drawing data according to a third embodiment of the present invention.

FIGS. 11A and 11B depict a flowchart that illustrates one example of a process for rearranging drawing data according to a fourth embodiment of the present invention.

FIGS. 12A to 12C illustrate examples of how drawing data is rearranged according to the fourth embodiment of the present invention.

FIG. 13 is a flowchart that illustrates an example of a process for rearranging drawing data according to a fifth embodiment of the present invention.

DESCRIPTION OF THE EMBODIMENTS

An information processing apparatus according to specific embodiments of the present invention will now be described below with reference to the accompanying drawings.

First Embodiment

Figure 1:
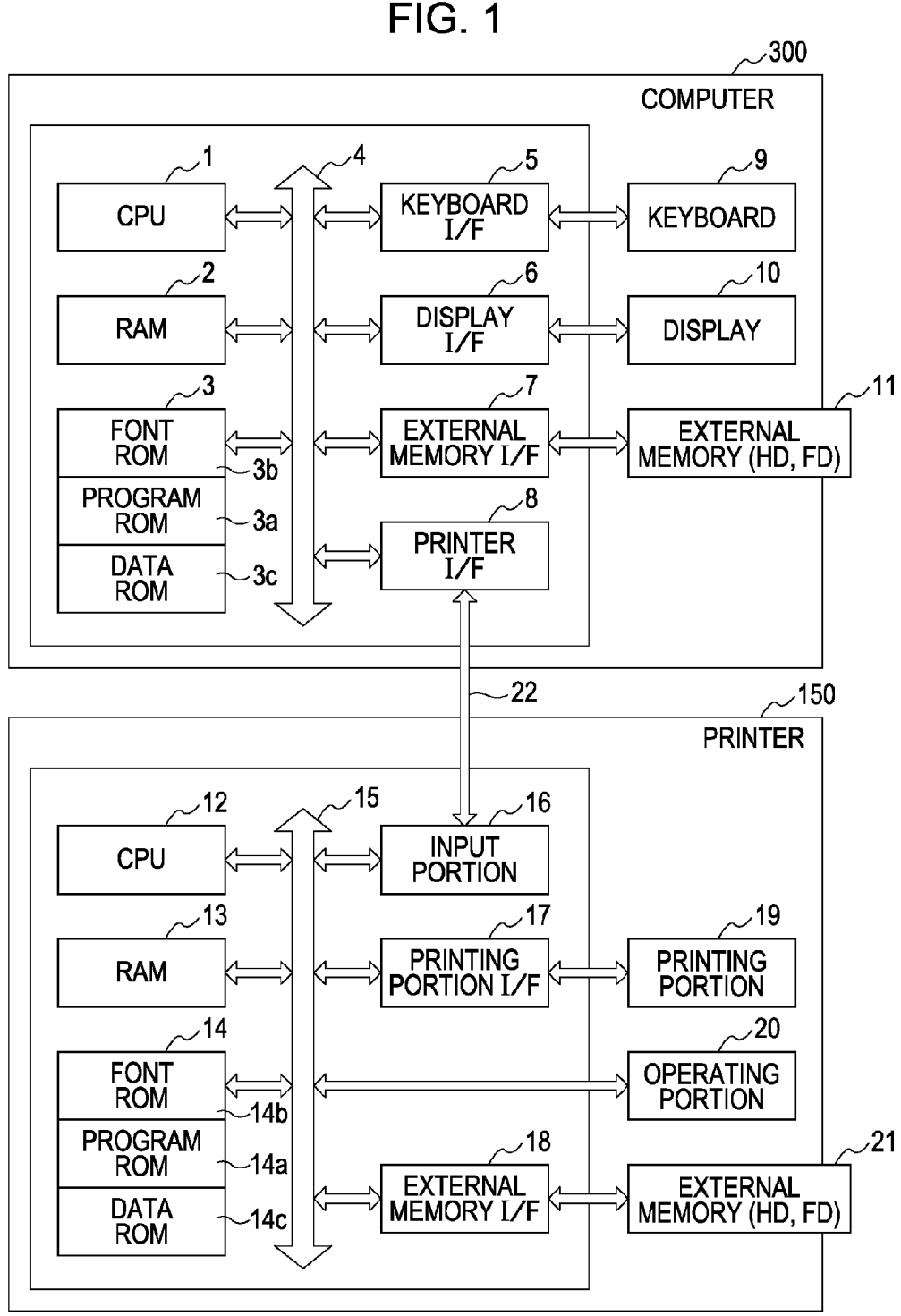
FIG. 1 is a block diagram that illustrates a configuration of a computer and printer that are an information processing apparatus according to an embodiment of the present invention.

FIG. 1 is a block diagram that illustrates a general configuration of an information processing apparatus according to a first embodiment of the present invention.

Referring to FIG. 1, the information processing apparatus according to the first embodiment can lay out a plurality of drawing data elements contained in pages of a document in a certain region and produce an output of the document. The information processing apparatus includes a computer 300 serving as a host computer or an information processing terminal and a printer 150 connected to the computer 300.

The computer 300 includes a central processing unit (CPU) 1, a random-access memory (RAM) 2, a read-only memory (ROM) 3, a keyboard interface (I/F) 5, a display I/F 6, an external memory I/F 7, a printer I/F 8, and a system bus 4 connecting the above-described components so as to allow them to communicate with one another.

The CPU 1 controls the devices connected to the system bus 4. The CPU 1 executes document processing for a document that contains a figure, an image, text, and a table (including a spreadsheet) on the basis of a document processing program. The RAM 2 functions as a main memory and work area of the CPU 1.

The ROM 3 includes a program ROM 3a, a font ROM 3b, and a data ROM 3c. The program ROM 3a and an external memory 11 store a document processing program for use in creating a document. The program ROM 3a and the external memory 11 store an operating system (hereinafter referred to as OS) being a control program of the CPU 1 and a program necessary to cause the information processing apparatus to operate.

The font ROM 3b and the external memory 11 store font data for use in processing. The data ROM 3c or the external memory 11 stores various kinds of data for use in the document processing.

The keyboard I/F 5 controls entry from a keyboard 9 or a pointing device (not shown). The display I/F 6 controls displaying of a display 10. The external memory I/F 7 controls access to the external memory 11 (e.g., an HD or a Floppy® disk (FD)).

The printer I/F 8 is connected to the printer 150 through a predetermined interactive interface 22 and controls communications with the printer 150. The external memory 11 stores a boot program, various applications, font data, a user file, an editing file, and a printer driver.

The CPU 1 can convert an outline font in a display information RAM set on the RAM 2 (rasterization), for example, and enables WYSIWYG on the display 10.

The CPU 1 can open various registered windows on the basis of a command specified by use of, for example, a mouse cursor (not shown) on the display 10 and execute various kinds of data processing. In printing, a user can open a window regarding the print setting to specify the setting for the printer 150 and specify the setting for a printing method for the printer driver, including selection of the printing mode.

The printer 150 includes a CPU 12, a RAM 13, a ROM 14, a system bus 15, an input portion 16, a printing portion I/F 17, an external memory I/F 18, a printing portion 19, an operating portion 20, and an external memory 21. The ROM 14 includes a program ROM 14a, a font ROM 14b, and a data ROM 14c.

The CPU 12 outputs an image signal as output information to the printing portion (printer engine) I/F 17 connected to the system bus 15 on the basis of, for example, a control program. The control program is stored in, for example, the program ROM 14a of the ROM 14 or the external memory 21.

The program ROM 14a stores the program control of the CPU 12. The font ROM 14b stores font data for use in creating the output information. If the printer 150 does not have the external memory 21 (e.g., an HD), the data ROM 14c stores information for use on the computer 300.

The CPU 12 can communicate with the computer 300 through the system bus 15, the input portion 16, the interface 22, the printer I/F 8, and the system bus 4 and can inform the computer 300 of information stored in the printer 150.

The external memory I/F 18 can be connected to an optional font card, in addition to a memory for a built-in font, as the external memory 21. The external memory I/F 18 may also be connected to the external memory 21 that stores a program for use in interpreting a printer control language having a different language system.

The RAM 13 functions as a main memory and work area of the CPU 12. The amount of memory of the RAM 13 can be increased by use of an optional RAM connected to an expansion port (not shown). The RAM 13 can be used as an output information expanding region, an environmental data storage region, and nonvolatile RAM (NVRAM). The operating portion (operating panel) 20 is a panel that has a switch and a light-emitting diode (LED) indicator for use in operation.

Examples of the external memory 21 include an HD and an IC card. Access to the external memory 21 can be controlled by a memory controller. The external memory 21 is optional and can store font data, an emulation program, and form data. The external memory 21 can be composed of a single memory or a plurality of memories. The printer 150 further includes an NVRAM (not shown). The NVRAM may store information on the setting for the printer mode input from the operating portion 20.

Figure 2:
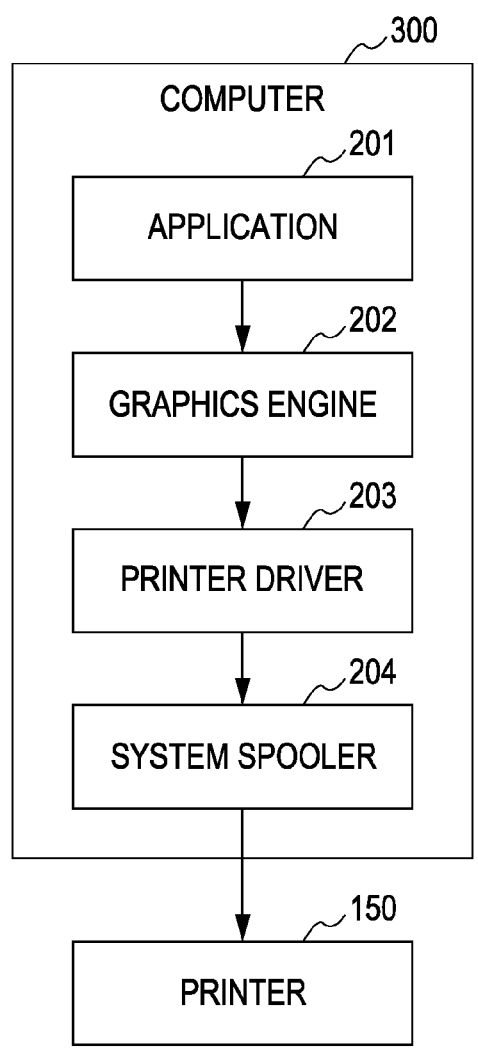
FIG. 2 illustrates a configuration of a program module for printing according to an embodiment of the present invention.

FIG. 2 illustrates a configuration of a program module that is for use in printing and that operates on the computer 300 connected to the printer 150. An application 201, a graphics engine 202, a printer driver 203, and a system spooler 204 are stored in an HD serving as the external memory 11. The program module is loaded into the RAM 2 by the OS or an application that uses the module. The CPU 12 executes the loaded program module. The application 201 and the printer driver 203 are stored in the HD serving as the external memory 11 through an FD or a compact-disk read-only memory (CD-ROM), which is not shown, serving as the external memory 11, or over a network (not shown).

The application 201 can be software for use in creating a document, for example. The graphics engine 202 loads the printer driver 203 prepared for each printer 150 from the external memory 11 to the RAM 2 and converts an output of the application 201 into a control command for the printer 150 using the printer driver 203. The system spooler 204 stores print data in a buffer, spools the data, and sequentially outputs the data to the printer 150.

Figure 3:
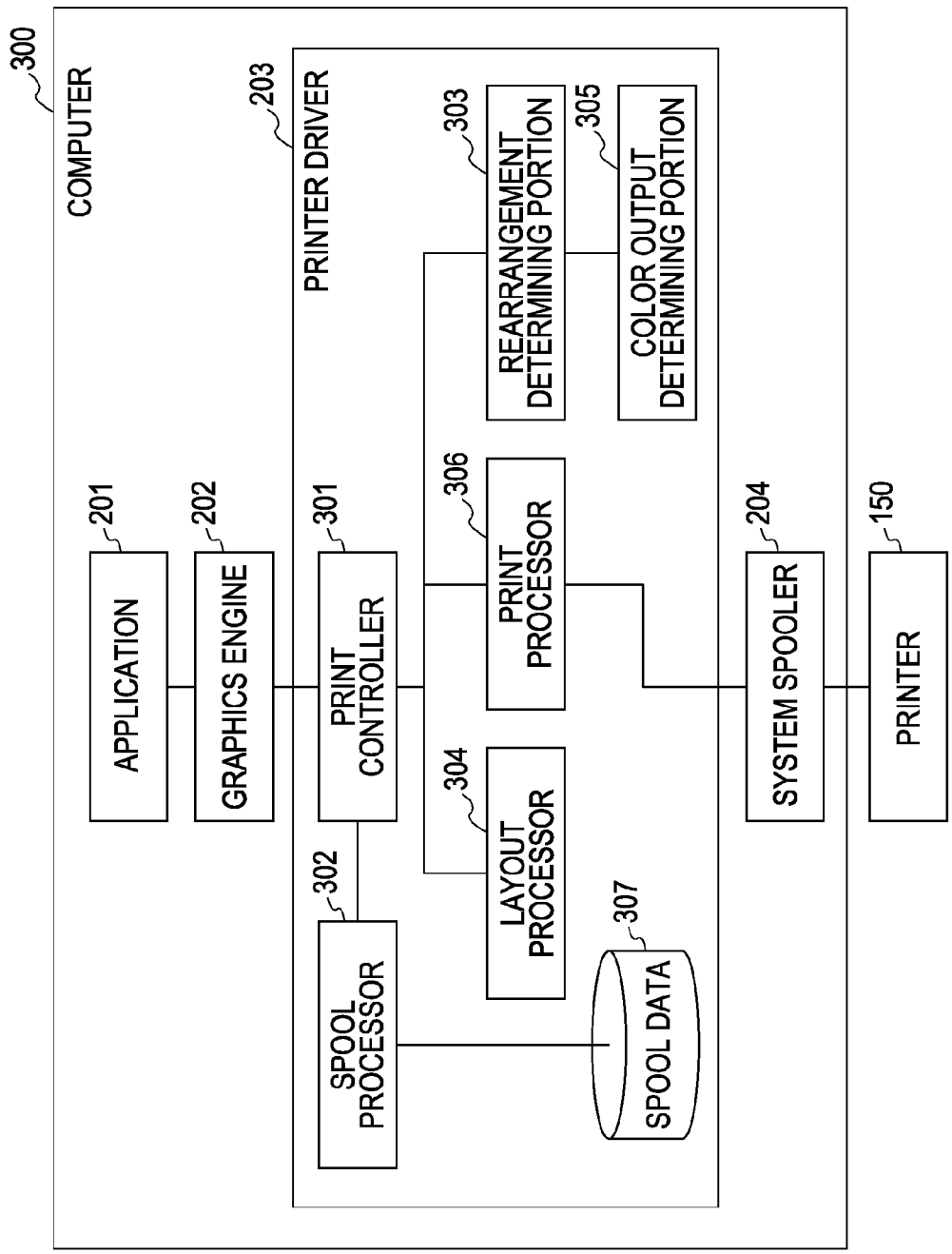
FIG. 3 illustrates a configuration of a program module and printer driver for printing according to an embodiment of the present invention.

FIG. 3 illustrates one example of a configuration of the printer driver 203 according to the first embodiment. The printer driver 203 includes a print controller 301, a spool processor 302, a layout processor 304, a print processor 306, a rearrangement determining portion 303, and a color output determining portion 305. The printer driver 203 is stored in the external memory 11 of the computer 300, as previously described. The CPU 1 reads the printer driver 203 from the external memory 11 into the RAM 2 and executes it.

The print controller 301 controls the entire printing process in response to a printing instruction received from an application. The spool processor 302 spools (stores) the received printing instruction as spool data 307 in, for example, the external memory 11 or the RAM 2 under control of the print controller 301.

The rearrangement determining portion 303 determines whether drawing data can be rearranged in a blank area in a different region in the document (e.g., a different page or a different sheet). When determining that, even if the drawing data is rearranged in the blank area, an output result will remain unchanged, the rearrangement determining portion 303 determines that the drawing data is not to be rearranged. The layout processor 304 lays out the drawing data in the blank area.

When determining that the drawing data can be rearranged, the rearrangement determining portion 303 recognizes the color setting of a page that contains the drawing data to be rearranged, the color setting of a page in which the drawing data is to be rearranged, and the color or monochrome property of the drawing data to be rearranged. Then, in accordance with the recognition, the rearrangement determining portion 303 determines whether an expected color output result will be changed by the rearrangement.

The color output determining portion 305 calculates a color output result expected when the drawing data is rearranged in the blank area in a page. The color output result calculated by the color output determining portion 305 is provided to the rearrangement determining portion 303 and used in the determination whether the rearrangement is to be performed.

An example process for printing drawing data performed by the printer driver 203 will be described next with reference to FIG. 4. In the following description, "blank" and "space" indicate an area where text and image data can be created but neither text nor image data is actually laid out. Drawing data indicates data that can contain at least text, a figure, a table, and a photograph.

Figure 4:
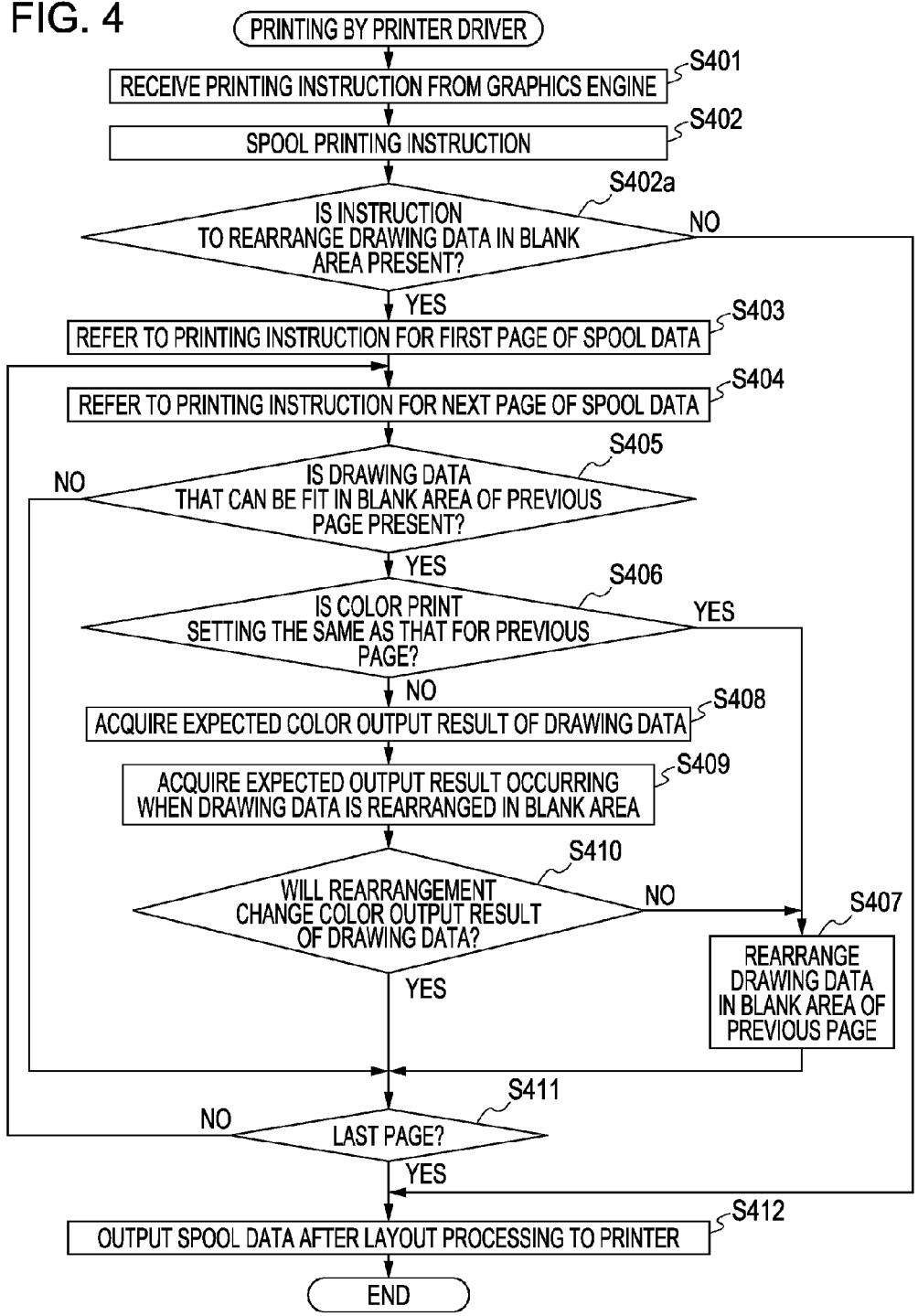
FIG. 4 is a flowchart that illustrates one example of a process for rearranging drawing data according to a first embodiment of the present invention.

FIG. 4 is a flowchart that illustrates one example of a process for rearranging drawing data performed by the printer driver 203. In the following description, the steps of the flowcharts illustrated in the embodiments of the present invention are basically performed by the CPU 1 or the CPU 12 reading each program module of the printer driver 203 from the memory.

In printing, a user who operates the computer opens a window for the print setting, specifies the setting for the printer 150, and specifies the setting for a print processing method for the printer driver 203, including selection of the printing mode. As a result, the CPU 1 opens various registered windows on the basis of a command instructed by use of, for example, a mouse cursor (not shown) on the display 10 and executes various kinds of data processing regarding printing.

The CPU 1 first detects that printing is selected in the application 201. Then, the CPU 1 calls the printer driver 203 through the graphics engine 202 and executes the processing described below.

In step S401, the print controller 301 receives a printing instruction from the application 201. In step S402, the print controller 301 temporarily spools (stores) the printing instruction received in step S401 as the spool data 307 in, for example, the external memory 11 or the RAM 2. The printing instruction can include, in addition to drawing data, an instruction to rearrange the drawing data in a blank area and data of print setting, such as color print setting.

For example, the print controller 301 can store the printing instruction corresponding to four pages as the spool data 307 in the data ROM 14c, as illustrated in FIG. 5A. The color setting, which is the print setting data, is indicated below each page in FIG. 5A. Examples of assignment of the color print setting include "automatic," "monochrome assigned," and "color assigned." Note that "automatic" used here indicates the setting in which drawing data determined as having the color property is output in color mode and drawing data determined as having only the monochrome property is output in monochrome mode.

In step S402a, the print controller 301 determines whether the printing instruction contains an instruction to rearrange drawing data in a blank area. When the printing instruction does not contain that instruction (NO in step S402a), flow proceeds to step S412, where the print processor 306 outputs the drawing data to the system spooler 204 in a normal manner. An instruction to rearrange drawing data in a blank area can be set by use of a setting screen of the printer driver, for example.

In step S402a, when the print controller 301 determines that the printing instruction does contain an instruction to rearrange drawing data in a blank area (YES in step S402a), in step S403, the print controller 301 refers to a printing instruction for the first page of the spool data 307.

In step S404, the print controller 301 refers to a printing instruction for the next page, and flow proceeds to step S405. In step S405, the rearrangement determining portion 303 determines whether there is a drawing data element that can be fit in a blank area in a previous page.

In step S405, if the rearrangement determining portion 303 determines that there is a drawing data element that can be fitted in a blank area in a previous page (YES in step S405), flow proceeds to step S406. That is, as illustrated in FIG. 5A, when the rearrangement determining portion 303 determines that a drawing data element 502 in the second page can be rearranged in a blank area in the first (i.e. left-most) page, flow proceeds to the next step S406.

In step S406, the rearrangement determining portion 303 determines whether the color print setting for a subsequent page referred to in step S404, for example, the color setting for the second page illustrated in FIG. 5A is the same as the color print setting for a previous page, for example, the first page. In the example illustrated in FIG. 5A, the print setting for the first page is "automatic," whereas the print setting for the second page is "monochrome assigned," i.e., they are different. Accordingly, the rearrangement determining portion 303 makes a determination of "NO" in step S406, and flow proceeds to step S408.

In the example illustrated in FIG. 5A, a drawing data element having the color property is represented as a lightly shaded one (502, 504), whereas a drawing data element having the monochrome property is represented as a darkly shaded one (501, 503).

In step S408, the color output determining portion 305 calculates a color output result expected when a drawing data element determined as being able to be rearranged in a blank area in a previous page in step S405, for example, the drawing data element 502 is output in accordance with the print setting.

FIG. 5B illustrates a color output result expected when the pages are output in accordance with the print setting. The drawing data element 502 in the second page originally has the color property, whereas the color print setting for the second page is "monochrome assigned." Because of this, in the case of the example illustrated in FIG. 5B, the expected color output result in step S408 is "monochrome."

In the next step S409, the color output determining portion 305 calculates a color output result expected when the drawing data element 502 determined as being able to be rearranged in a blank area in step S405 is rearranged in a blank area in a previous page, for example, the first page. At this time, the color output determining portion 305 calculates the color output result from the color or monochrome property of the drawing data element 502 and the color print setting for each of neighboring pages, for example, the first and second pages illustrated in FIG. 5A.

FIG. 5C illustrates a color output result expected when the drawing data element 502 contained in the second page illustrated in FIG. 5A is rearranged in a blank area in the first page. As illustrated in FIG. 5A, the drawing data element 502 originally has the color property. If the drawing data element 502 is printed in accordance with the color print setting "automatic" of the first page, the drawing data element 502 is output in accordance with the color property. Accordingly, the color output result calculated in step S409 is "color."

Then, in step S410, the rearrangement determining portion 303 compares the color output result calculated by the color output determining portion 305 in step S408 and that in step S409 and determines whether rearrangement of the drawing data element will change the color output result. When it is determined that the color output result will be changed (YES in step S410), flow proceeds to step S411 without the rearrangement. That is, in the example illustrated in FIG. 5A, in step S410, the rearrangement determining portion 303 determines that, if the drawing data element 502 in the second page is rearranged in the blank area in the first page, the color output result will be changed. The rearrangement determining portion 303 determines that the rearrangement is not to be performed, and flow proceeds to the next step S411.

In step S410, when the rearrangement determining portion 303 determines that, if the drawing data element 502 in the second page is rearranged in the blank area in the first page, the color output result will remain unchanged, flow proceeds to step S407.

In step S407, the print controller 301 rearranges the drawing data element 502 determined in step S405 as being able to be rearranged in a previous page, for example, the first page illustrated in FIG. 5A, in the blank area in the first page through the layout processor 304.

Also when in step S406 the rearrangement determining portion 303 determines that the color setting for the drawing data element in the current page is the same as the color print setting (YES in step S406), flow proceeds to step S407, where the print controller 301 performs the above-described processing. When the processing in step S407 is completed, flow proceeds to step S411. In step S411, the print controller 301 determines whether the page referred to in step S404 is the last page.

When it is determined that the current page is not the last page (NO in step S411), flow returns to step S404, and the printing instruction for the next page in the spool data 307 is referred to, and the same processing is performed again. That is, the drawing data element 503 in the third page has the monochrome property as the print property, so a color output result will remain unchanged if the drawing data element 503 is rearranged in a blank area in the second page. Accordingly, the layout processor 304 rearranges the drawing data element 503 in the blank area in the second page.

In step S411, when the print controller 301 determines that the current page is the last page (YES in step S411), flow proceeds to step S412, where the print controller 301 outputs the spool data 307 subjected to layout processing to the printer through the print processor 306. Also when the rearrangement determining portion 303 determines in step S405 that there is no drawing data element that can fit in the blank area in the previous page (NO in step S405), flow proceeds to step S411, where the print controller 301 performs the above-described processing.

Figure 6:
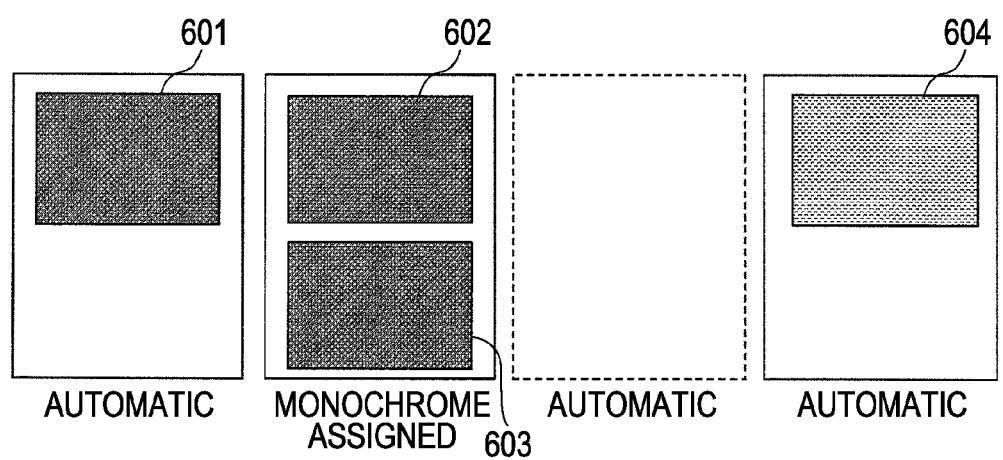
FIG. 6 illustrates a second example of a rearrangement of drawing data according to the first embodiment of the present invention.

When the printing instruction illustrated in FIG. 5A is processed in accordance with the flowchart illustrated in FIG. 4, the image data is laid out as illustrated in FIG. 6. More specifically, the drawing data element 502 in the second page is not moved (drawing data element 602), the drawing data element 503 in the third page is laid out in the blank area in the second page (drawing data element 603), and the drawing data element 504 in the fourth page is laid out so as to remain in the fourth page (drawing data element 604). The drawing data element 501/601 is also not moved.

With the first embodiment, the following advantages are obtainable. The drawing data element 503 originally has the monochrome property, and the print setting for the second page is "monochrome assigned." Accordingly, the number of printing can be reduced by one, and an intended print output is obtainable without changing the color property of the drawing data element.

In addition, the drawing data element 503, which has the monochrome property as the print property, is rearranged in the blank area in the second page, which has the print setting of monochrome assigned. Accordingly, toner or ink used in color printing can be saved.

In such a way, a printing process capable of reducing waste of printing and producing an intended color output can be achieved.

Second Embodiment

The information processing apparatus according to a second embodiment of the present invention will be described below. The first and second embodiments are different in the following respects. That is, in the first embodiment, it is determined whether drawing data can be rearranged in an immediately preceding page. In contrast, in the second embodiment, it is determined whether drawing data can be rearranged in, in addition to an immediately preceding page, a page before the immediately preceding page.

Figure 7B:
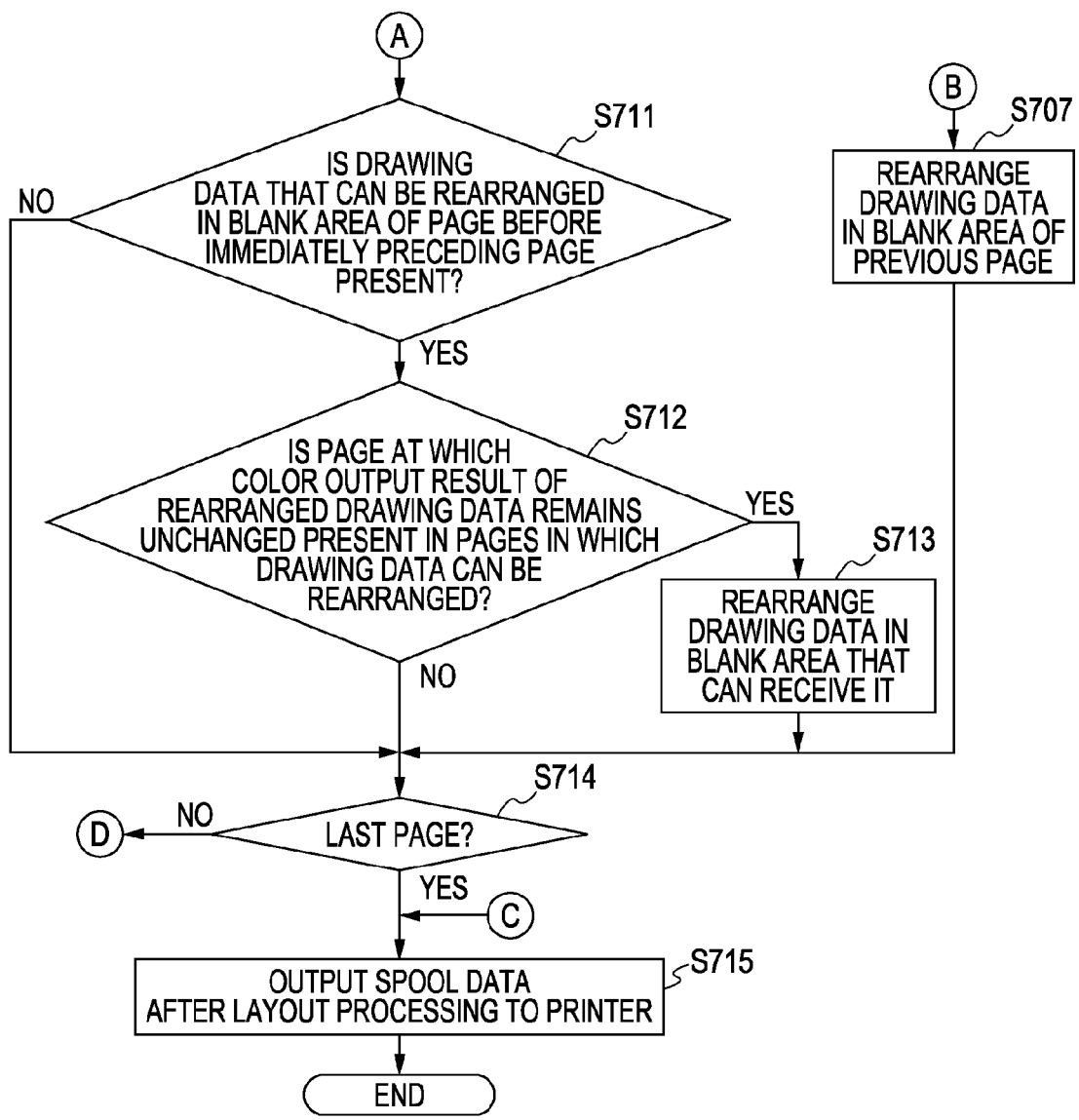

FIG. 7 is a flowchart that illustrates a second embodiment of a process for rearranging drawing data performed by the printer driver 203.

When a user provides an instruction to print data through a program, the CPU 1 receives a printing instruction. In response to the printing instruction, the CPU 1 executes a rearrangement process of image data illustrated in FIG. 7. Steps S701 to S710 are substantially the same as the rearrangement process described in FIG. 4. The detailed description of those steps is not repeated here, and the basically different steps are described below.

In step S710, when the color output determining portion 305 determines that rearrangement of the drawing data element will change the color output result (YES in step S710), flow proceeds to step S711. In the present embodiment, also when it is determined in step S705 that there is no drawing data element that can be fit in a blank area in a previous page (NO in step S705), flow proceeds to step S711.

In step S711, the rearrangement determining portion 303 determines whether there is a drawing data element that can be fit in a blank area in a page before the immediately preceding page among the drawing data in the page referred to in step S704.

Figure 8A:
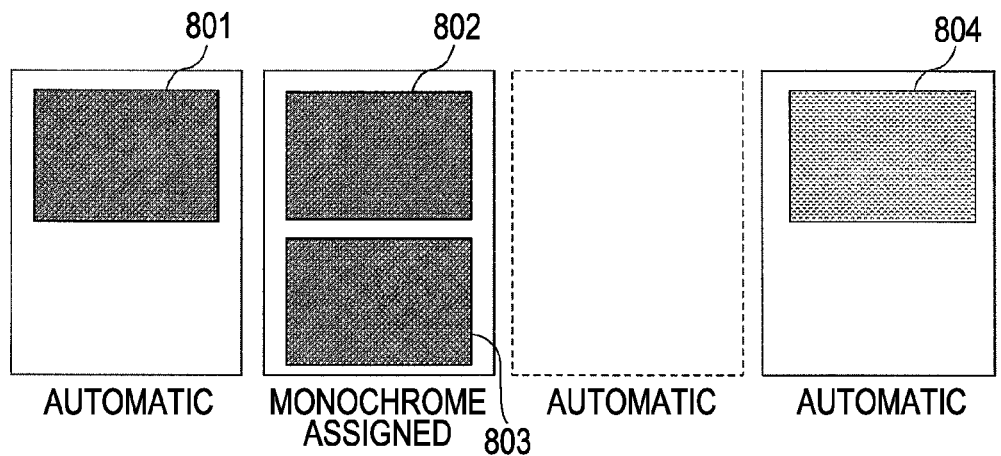
FIGS. 8A and 8B illustrate an example of how drawing data is rearranged according to the second embodiment of the present invention.

In the example illustrated in FIG. 8A, with respect to a drawing data element 804, the rearrangement determining portion 303 determines that, although the second page being the immediately preceding page (because the third page is effectively removed) has no blank area in which the drawing data element 804 can be rearranged, the drawing data element 804 can be rearranged in a blank area in the first page.

In step S711, when the rearrangement determining portion 303 determines that there is a drawing data element that can be rearranged (YES in step S711), flow proceeds to step S712. In step S712, the color output determining portion 305 determines whether there is a page at which rearrangement of the drawing data element will not change the color output result among one or more pages determined in step S711 as being able to receive the drawing data element.

In the example illustrated in FIG. 8A, the drawing data element 804 has the color property as the print property, and the page in which the drawing data element 804 is contained has the color print setting "automatic." Accordingly, the color output determining portion 305 determines that an expected color output result is "color." The color print setting for the first page is also "automatic," so if the drawing data element 804 is rearranged in a blank area in the first page, the expected color output result will remain unchanged. Accordingly, in step S712, the rearrangement determining portion 303 determines that the drawing data element 804 can be rearranged in the blank area in the first page, as shown in FIG. 8A.

Figure 8B:
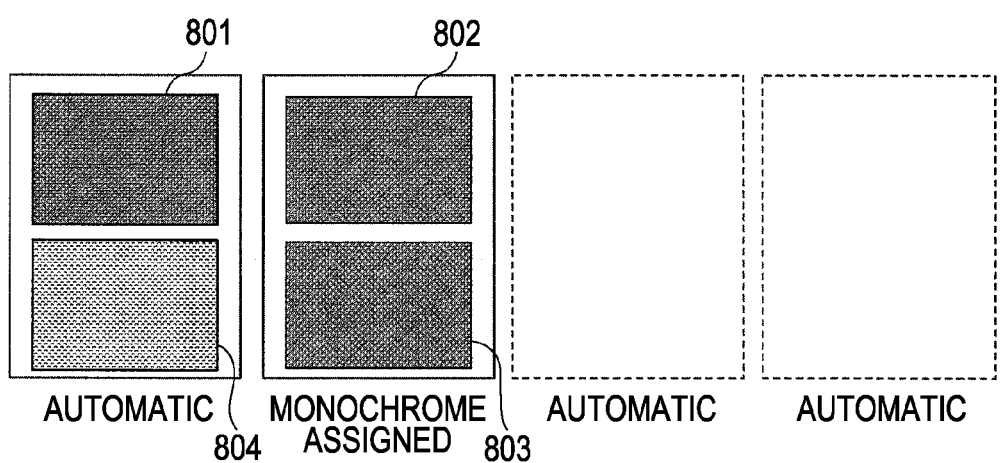

In step S712, when the color output determining portion 305 determines that there is a page at which the color output result will remain unchanged (YES in step S712), flow proceeds to step S713, where the layout processor 304 rearranges the drawing data element in the blank area that can receive it. In such a way, the drawing data element 804 illustrated in FIG. 8A is rearranged in the blank area in the first page, as illustrated in FIG. 8B.

When the rearrangement determining portion 303 determines that there is no drawing data element that can be rearranged (NO in step S711) or when the rearrangement determining portion 303 determines that there is no page at which the color output result will remain unchanged (NO in step S712), flow proceeds to step S714.

Step S714 and its subsequent steps are substantially the same as in the first embodiment, so the description thereof is not repeated here. The information processing apparatus according to the second embodiment can skip an immediately preceding page and rearrange a drawing data element in a blank area in a page before the immediately preceding page. Accordingly, a printing process capable of reducing waste of printing and producing an intended color output can be achieved.

Third Embodiment

The information processing apparatus according to a third embodiment of the present invention will be described below. The first and third embodiments are different in the following respects. That is, in the first embodiment, two drawing data elements are rearranged in one physical page. In contrast, in the third embodiment, in printing N drawing data elements (i.e. N logical pages) laid out in one physical page or sheet (hereinafter referred to as N-up printing), it is determined whether rearrangement is to be performed on the basis of a color output result expected when drawing data elements are rearranged in a blank area after N-up layout. The term "N-up layout" indicates laying out N drawing elements (i.e. logical pages) in one physical page.

The third embodiment has substantially the same configuration as in the first embodiment illustrated in FIG. 3. In the third embodiment, when N-up printing is designated in a document, it is determined whether a color output result will be changed on the basis of a color output result produced after N-up layout.

FIG. 9 is a flowchart that illustrates one example of a process for rearranging drawing data performed by the printer driver 203 executing N-up printing according to the third embodiment.

When a user provides an instruction to print data through a program, the CPU 1 receives a printing instruction. In response to the printing instruction, the CPU 1 executes a rearrangement process of image data illustrated in FIG. 9. When printing is selected in the application 201, the printer driver 203 is called from the application 201 through the graphics engine 202.

In step S901, the print controller 301 of the printer driver 203 receives the printing instruction from the application 201. In step S902, the print controller 301 temporarily stores the printing instruction as the spool data 307 in, for example, the external memory 11 or the RAM 2 through the spool processor 302.

Figure 10A:
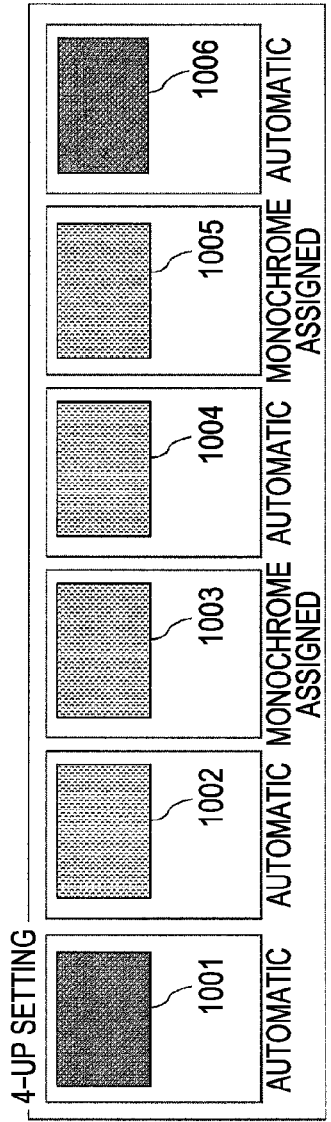
FIGS. 10A to 10E illustrate one example of how drawing data is rearranged according to the third embodiment of the present invention.

In the third embodiment, the spool processor 302 stores a printing instruction corresponding to six pages, 1001, 1002, 1003, 1004, 1005, and 1006, as illustrated in FIG. 10A, as the spool data 307 in the data ROM 14c. In this example, the print setting is the one in which four logical pages are positioned together in one physical page, which is called 4-up printing.

Steps S902a to S906 are substantially the same as in the rearrangement process described in FIG. 4. Thus, the detailed description is not repeated here, and basically different steps are described below.

In step S908, the print controller 301 acquires the N-up print setting specified in the spool data 307. In this example, the print controller 301 acquires the 4-up print setting.

In step S909, the color output determining portion 305 calculates a color output result expected after the drawing data element determined in step S905 as being able to be rearranged in a blank area in a previous page is laid out in accordance with the N-up printing instruction.

Figure 10B:
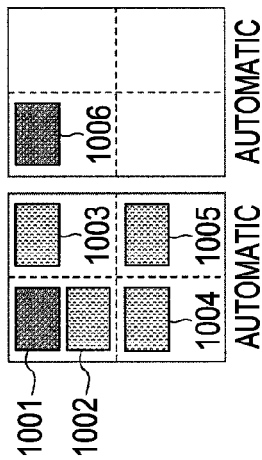

FIG. 10B illustrates an example in which the six logical pages of drawing data illustrated in FIG. 10A is laid out in accordance with the 4-up printing instruction. In N-up layout, if logical pages placed together in one physical page have the same color print setting, the page inherits that setting.

However, when there are different color print settings, if at least one logical page contains an "automatic" setting, the color setting of the physical page after N-up layout is normally "automatic." As illustrated in FIG. 10B, the color print setting for the first page after 4-up layout is "automatic," so the color output determining portion 305 determines that the color output result of a drawing data element 1002 after N-up layout is "color," even though, for example, a drawing data element 1003 was monochrome assigned.

In step S910, the color output determining portion 305 calculates a color output result expected when a drawing data element determined in step S905 as being able to be rearranged in the blank area in the previous page is rearranged in the blank area after N-up layout.

Figure 10C:
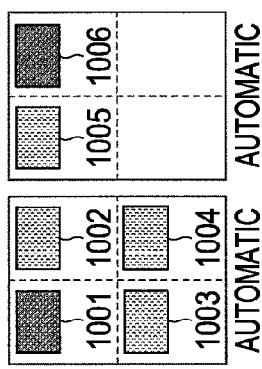
Figure 10D:
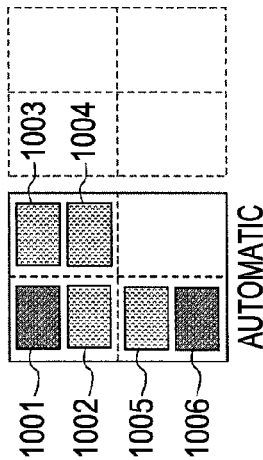

FIG. 10C illustrates an example in which the drawing data element 1002 is rearranged in the first logical page. When the drawing data element 1002 is rearranged in the first logical page, because the color print setting "automatic" remains in the first page, the color output determining portion 305 determines that the expected color output result for the drawing data element 1002 is "color."

In step S911, the rearrangement determining portion 303 compares the color output result calculated in step S909 and that in step S910 and determines whether the color output result of will be changed by the rearrangement. When the rearrangement determining portion 303 determines that the color output result will be changed (YES in step S911), flow proceeds to step S912 without the rearrangement of the drawing data element.

It is determined that, if the drawing data element 1002 illustrated in FIG. 10B is rearranged in the first page, the color output result will remain unchanged (because the second page of FIG. 10B was already in an "automatic" setting, so the drawing data element 1002 was already going to be in color, even though it was originally monochrome assigned in FIG. 1A). Accordingly, in step S911, the rearrangement determining portion 303 determines that the rearrangement is to be performed.

In step S911, when the color output determining portion 305 determines that the color output result will remain unchanged (NO in step S911), flow proceeds to step S907. The subsequent steps are substantially the same as in the first embodiment, so the description thereof is not repeated here.

Figure 10E:
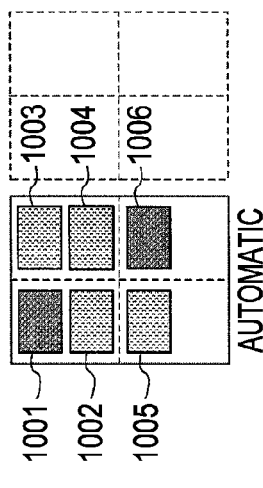

When a 6-page document is subjected to steps S904 to S911, the layout changes from FIG. 10B to FIG. 10C to FIG. 11D to FIG. 10E. FIG. 10E illustrates a printing result. In the layout illustrated in FIG. 10E, drawing data elements 1001 to 1006 are placed together in one page, and even if the page contains a drawing data element having the monochrome print setting, the page is output in color mode. To avoid this, in FIG. 9, when it is determined that the color output result will be changed in step S911, flow may proceed to step S912 without the processing in step S907.

As described above, the information processing apparatus according to the third embodiment determines that rearrangement is to be performed on the basis of a color output result expected when the a drawing data element is rearranged in a blank area after N-up layout. Accordingly, even if N-up printing is performed, a printing process capable of reducing waste of printing and producing an intended color output can be achieved.

Fourth Embodiment

The information processing apparatus according to a fourth embodiment of the present invention will be described below. The fourth and first embodiments are different in the following respects. That is, in the first embodiment, when it is determined that a color output result will be changed, rearrangement is not performed. In contrast, in the fourth embodiment, even when it is determined that a color output result will be changed, if the number of printing will be able to be reduced, rearrangement is performed.

The fourth embodiment has substantially the same configuration as in the first embodiment illustrated in FIG. 3. In the fourth embodiment, the rearrangement determining portion 303 determines whether the number of sheets to be output can be reduced by rearrangement of a drawing data element in accordance with the print setting specified in a document. When determining that the number of sheets to be output can be reduced, the rearrangement determining portion 303 determines that the rearrangement of the drawing data element is to be performed, irrespective of a determination in previous steps.

Figure 11B:
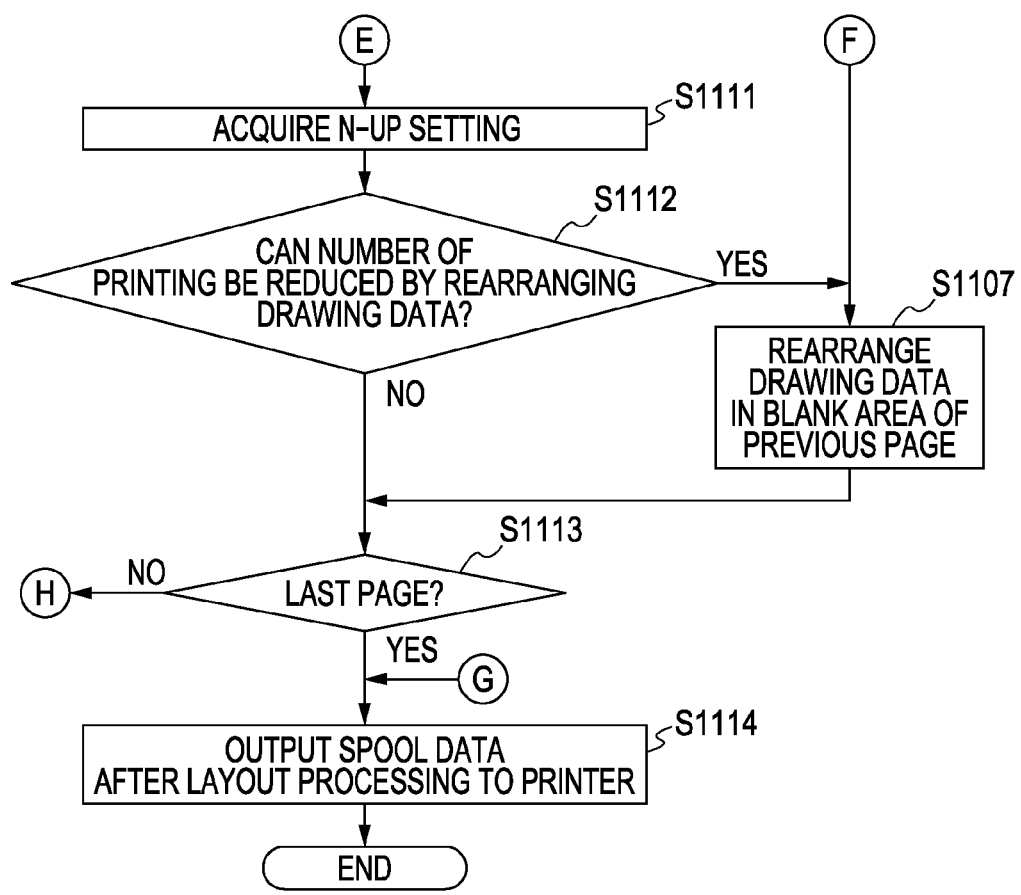

FIG. 11 (made up of FIGS. 11A and 11B) is a flowchart that illustrates one example of a process for rearranging drawing data performed by the printer driver 203 according to the fourth embodiment executing N-up printing or duplex printing. The program of the printer driver 203 relating to this flowchart is stored in the HD as the external memory 11 of the computer, and it is read into the RAM 2 on startup of the computer 300.

When a user provides an instruction to print data through a program, the CPU 1 receives a printing instruction. In response to the printing instruction, the CPU 1 executes a rearrangement process of image data illustrated in FIG. 11. When printing is selected in the application 201, the printer driver 203 is called from the application 201 through the graphics engine 202.

In step S1101, the print controller 301 of the printer driver 203 receives a printing instruction from the application 201. In step S1102, the print controller 301 temporarily stores the printing instruction received in step S1101 as the spool data 307 in, for example, the external memory 11 or the RAM 2 through the spool processor 302.

In the fourth embodiment, as one example, the spool processor 302 stores a printing instruction corresponding to five pages, 1201, 1202, 1203, 1204, and 1205, illustrated in FIG. 12A as the spool data 307. In this example, the print controller 301 receives a printing instruction to rearrange five logical pages in one physical page by 4-up layout.

Steps S1102a to S1110 are substantially the same as the rearrangement process of steps S402a to S410 described in FIG. 4, so the detailed description thereof is not repeated here and basically different steps are described below.

In step S1110, when the color output determining portion 305 determines that the color output result of the drawing data element will be changed, flow proceeds to step S1111. Although a drawing data element 1205 in the fifth page illustrated in FIG. 12A can be rearranged in a blank area in the fourth page, the color output determining portion 305 determines that the rearrangement will change the color output result, so flow proceeds to step S1111.

In step S1111, the print controller 301 acquires the N-up setting specified in the spool data 307. In step S1112, the rearrangement determining portion 303 determines whether the number of printing can be reduced by the rearrangement of the drawing data element determined in step S1105 as being able to be rearranged in the blank area in the previous page.

FIG. 12B illustrates a result of laying out the drawing data illustrated in FIG. 12A in accordance with the 4-up instruction. In FIG. 12B, when the drawing data element 1205 is rearranged in a logical page that contains a drawing data element 1204 in the previous physical page, the number of sheets printed will be reduced by one.

Accordingly, in the example illustrated in FIG. 12B, in step S1112, the rearrangement determining portion 303 determines that the number of printing can be reduced. Then, in step S1107, the layout processor 304 rearranges the drawing data element 1205. FIG. 12C illustrates a result of executing the rearrangement. Subsequent steps are substantially the same as in the first embodiment, so the description thereof is not repeated here.

In the layout illustrated in FIG. 12C, the drawing data elements 1201 to 1205 are placed in one page, and although the page contains the drawing data element having the monochrome print setting, the page is output in color mode.

As described above, with the information processing apparatus according to the fourth embodiment, in N-up printing or duplex printing, even when rearrangement changes the color output result, if the number of printing can be reduced, the rearrangement is performed. Accordingly, a printing process capable of reducing waste of printing and producing an intended color output can be achieved.

Fifth Embodiment

The information processing apparatus according to a fifth embodiment of the present invention will be described below. The fifth and first embodiments are different in the following respects. That is, in the first embodiment, it is determined whether drawing data can be rearranged on the basis of an expected color output result. In contrast, in the fifth embodiment, a user can select prioritizing paper savings or prioritizing the color setting.

The fifth embodiment has a similar configuration to that of the first embodiment illustrated in FIG. 3. In the fifth embodiment, the print controller 301 further includes a selection portion for use in alternatively selecting prioritizing savings of sheets to be output or prioritizing the color setting (a paper-savings prioritization radio button 1402 and a color-setting prioritization radio button 1403 illustrated in FIG. 14). When the setting in which a reduction in sheets to be output is prioritized is selected, it is determined that the drawing data element is to be rearranged, irrespective of a determination made by the color output determining portion 305.

FIG. 13 is a flowchart that illustrates one example of a process for rearranging drawing data performed by the printer driver 203. The program relating to this flowchart of the printer driver 203 is stored in the HD as the external memory 11 of the computer, and it is read into the RAM 2 on startup of the computer 300.

When a user provides an instruction to print data through a program, the CPU 1 receives a printing instruction. In response to the printing instruction, the CPU 1 executes a rearrangement process of image data illustrated in FIG. 13.

Steps S1301 to S1305 are substantially the same as basic processing of steps S401 to S405 in the first embodiment, so the description thereof is not repeated here. In step S1305, when the rearrangement determining portion 303 determines that there is a drawing data element that can be fit in a blank area in a previous page (region), flow proceeds to step S1306. In step S1306, the print controller 301 determines whether prioritization of paper savings is selected in the setting specified in the spool data 307.

Figure 14:
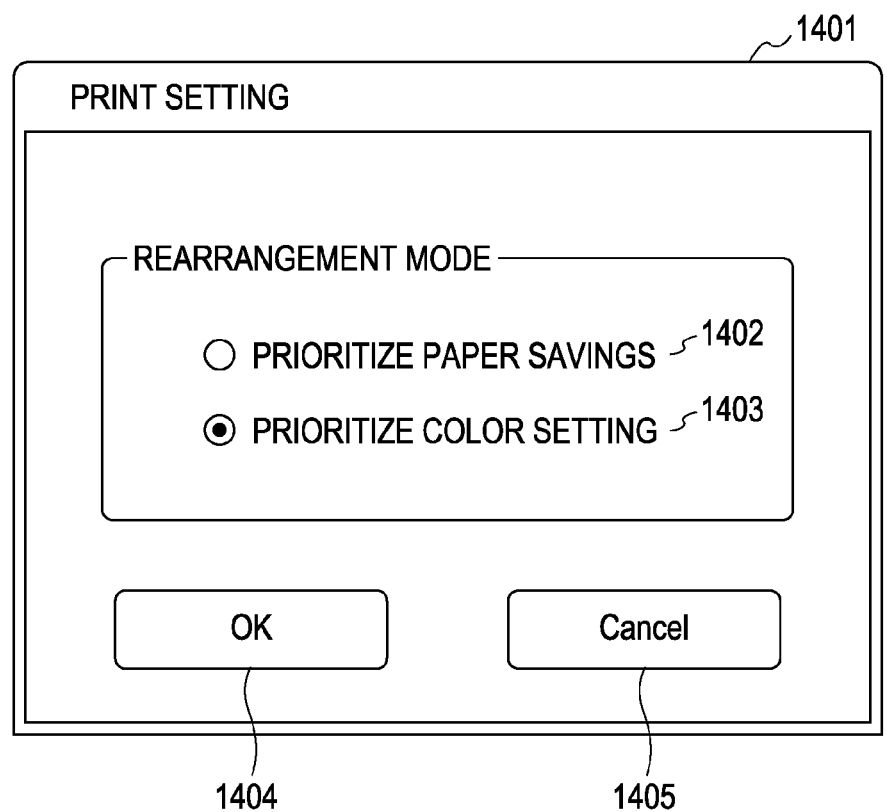
FIG. 14 illustrates an example user interface screen according to the fifth embodiment of the present invention.
Figure 15A:
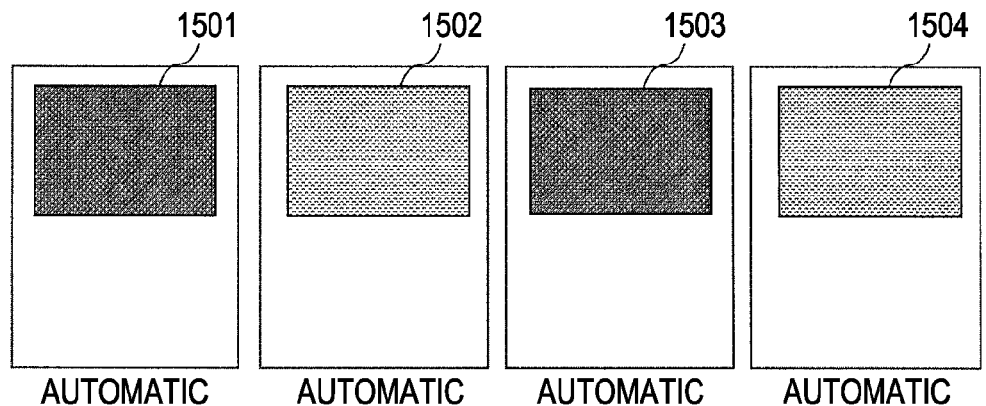
FIGS. 15A to 15C illustrate examples of how drawing data is rearranged according to a known art.
Figure 15B:
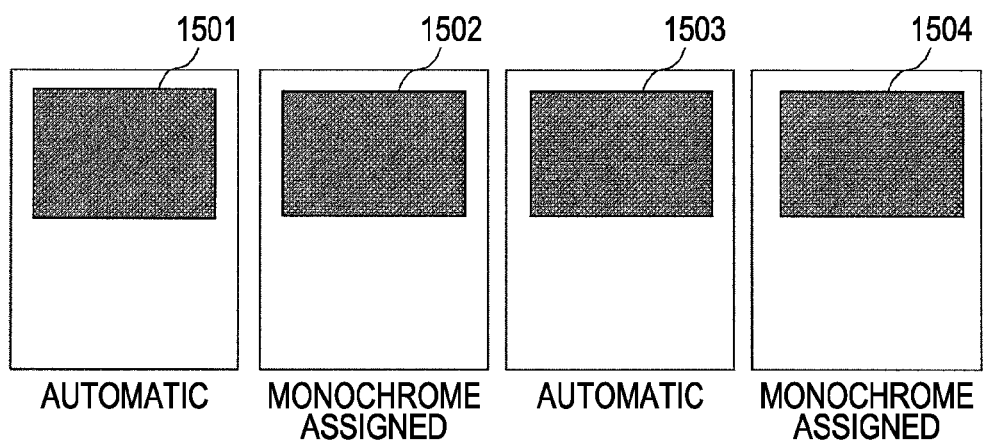
Figure 15C:
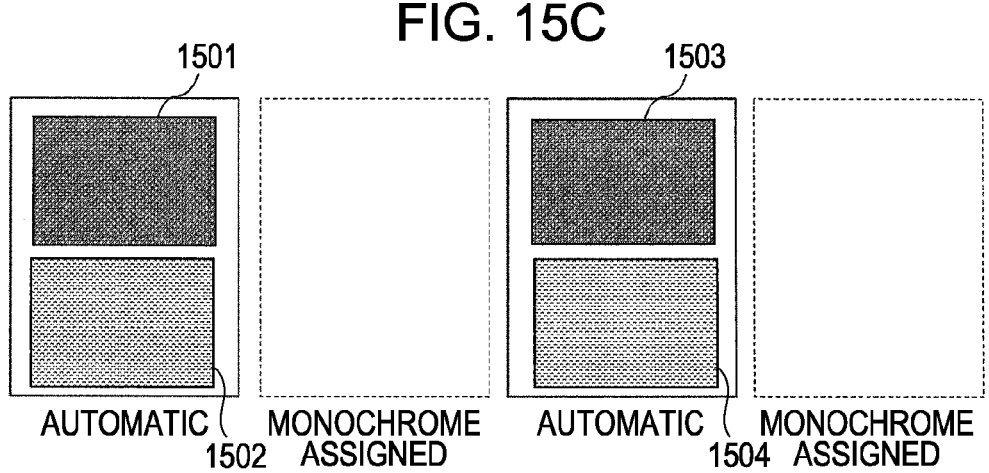

FIG. 14 illustrates one example of a user interface (UI) screen that can be displayed by the printer driver 203. The printer driver 203 displays this UI screen in response to an instruction from the application 201 before execution of printing. The print setting screen illustrated in FIG. 14 includes a print setting screen 1401, the paper-savings prioritization radio button 1402, the color-setting prioritization radio button 1403, an OK button 1404, and a cancel button 1405.

The paper-savings prioritization radio button 1402 or the color-setting prioritization radio button 1403 is alternatively selected, and the selection is confirmed by the pressing of the OK button 1404. The setting selected here is contained in the printing instruction in step S1301 and also contained in the spool data 307 in step S1302.

In step S1306, when the print controller 301 determines that the setting contained in the spool data 307 shows the state in which the paper-savings prioritization radio button 1402 is selected (YES in step S1306), flow proceeds to step S1308. When the state in which the color-setting prioritization radio button 1403 is selected is determined (NO in step S1306), flow proceeds to step S1307. Steps S1307, S1308, and subsequent steps S1311, S1312, and S1313 are substantially the same as in the first embodiment, so the description thereof is not repeated here.

As described above, the information processing apparatus according to the fifth embodiment determines whether rearrangement is to be performed on the basis of the setting of prioritization of paper savings or prioritization of the color setting. Accordingly, a printing process capable of reducing waste of printing and producing an intended color output can be achieved.

With the present invention, the rearrangement determining portion 303 determines whether rearrangement is to be performed on the basis of a color output result. Accordingly, an intended color output can be achieved while at the same time waste of printing is reduced.

The present invention can be achieved by performance of the following processing. That is, the processing is the one in which software (program) achieving the functions of at least one of the above-described embodiments is supplied to a system or an apparatus through a network or various storage media and a computer (or CPU or microprocessor unit (MPU)) of the system or apparatus reads and executes the program. In this case, the program and a storage medium that stores the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-187167 filed Jul. 18, 2008, which is hereby incorporated by reference herein in its entirety.

What is claimed is:

1. An information processing apparatus for laying out a plurality of drawing data elements contained in a document in one or more pages, the page and the drawing data element in the respective page being assigned a color output setting and the information processing apparatus comprising:

a rearrangement determining unit configured to determine whether at least one of the plurality of drawing data elements can be rearranged in a blank area in a different page; and a color output determining unit configured to, when the rearrangement determining unit determines that the drawing data element can be rearranged in the blank area, determine whether the drawing data element to be rearranged has a different color output setting from the different page, wherein, in dependence on the output of the color output determining unit, the rearrangement determining unit determines whether or not the drawing data element is to be rearranged in the different page.

2. The information processing apparatus according to claim 1, wherein, when it is determined that the drawing data element to be rearranged has a different color output setting from the different page, the rearrangement determining unit is configured to determine that the drawing data element is not to be rearranged in the different page and, when it is determined that the drawing data element does not have a different color output setting from the different page, the rearrangement determining unit is configured to determine that the drawing data element is to be rearranged in the different page.

3. The information processing apparatus according to claim 1, wherein, when the drawing data element cannot be rearranged in an immediately preceding page in the document, the rearrangement determining unit is configured to determine whether the drawing data element can be rearranged in another page.

4. The information processing apparatus according to claim 1, wherein, when a layout (N-up) is assigned in which a plurality of pages is positioned in a sheet for printing, the color output setting is set to be the same for all drawing data elements on the same sheet, and the color output determining unit is configured to determine whether a drawing data element to be rearranged has a different color output setting from the sheet to which it is intended to be rearranged.

5. The information processing apparatus according to claim 1, wherein the rearrangement determining unit is configured to determine whether a number of pages can be reduced by the rearrangement of at least one drawing data element, and when it is determined that the number of pages can be reduced, the rearrangement determining unit is configured to determine that the at least one drawing data element is to be rearranged, irrespective of a determination made by the color output determining unit.

6. The information processing apparatus according to claim 1, further comprising a selection unit configured to allow selection of one of prioritization of a reduction in a number of pages and prioritization of a color output setting, and wherein, when the prioritization of the reduction in the number of sheets to be output is selected, the rearrangement determining unit is configured to determine that the drawing data element is to be rearranged, irrespective of a determination made by the color output determining unit.

7. An information processing method for laying out a plurality of drawing data elements contained in a document in one or more pages, the pages and the drawing data elements in the respective page being assigned a color output setting, the information processing method being performed by a computer to perform operations comprising:

determining whether at least one of the plurality of drawing data elements can be rearranged in a blank area in a different page;

when it is determined that the drawing data element can be rearranged in the blank area, determining whether the drawing data element has a different color output setting from the different page; and in dependence on whether the drawing data element has a different color output setting from the different page, determining whether or not to rearrange the drawing data element in the different page.

8. The method according to claim 7, wherein, when it is determined that the drawing data element has a different color output setting from the different page, it is determined that the drawing data element is not to be rearranged in the different page and, when it is determined that the drawing data element does not have a different color output setting from the different page, it is determined that the drawing data element is to be rearranged in the different page.

9. A non-transitory storage medium that stores computer program code that, when executed on a computer, causes the computer to carry out an information processing method for laying out a plurality of drawing data elements contained in a document in one or more pages, the pages and the drawing data elements in the respective page being assigned a color output setting and the computer program code causing the computer to carry out:

determining whether at least one of the plurality of drawing data elements can be rearranged in a blank area in a different page;

when it is determined that the drawing data element can be rearranged in the blank area, determining whether the drawing data element has a different color output setting from the different page; and in dependence on whether the drawing data element has a different color output setting from the different page, determining whether or not to rearrange the drawing data element in the different page.

10. An information processing apparatus comprising:

a determination unit configured to determine whether or not a color output result of a drawing data element in a second page is changed by arranging the drawing data element in the second page to a blank area in a first page, the second page being a subsequent page of the first page;

a control unit configured not to arrange the drawing data element from the second page to the blank area of the first page, in a case where the determination unit determines that the color output result of the drawing data element is changed, and to arrange the drawing data element from the second page to the blank area of the first page, in a case where the determination unit determines that the color output result of the drawing data element is not changed.

11. An information processing method comprising:

determining whether or not a color output result of a drawing data element in a second page is changed by arranging the drawing data element in the second page to a blank area in a first page, the second page being a subsequent page of the first page;

arranging the drawing data element from the second page to the blank area of the first page, in a case where the color output result of the drawing data element is not changed.

12. A non-transitory storage medium that stores computer program code that, when executed on a computer, causes the computer to carry out an information processing method comprising:

determining whether or not a color output result of a drawing data element in a second page is changed by arranging the drawing data element in the second page to a blank area in a first page, the second page being a subsequent page of the first page;

arranging the drawing data element from the second page to the blank area of the first page, in a case where the color output result of the drawing data element is not changed.

* * * * *